US011106927B2

(12) United States Patent
Reiley et al.

(10) Patent No.: US 11,106,927 B2
(45) Date of Patent: Aug. 31, 2021

(54) METHOD FOR MONITORING AN INTERIOR STATE OF AN AUTONOMOUS VEHICLE

(71) Applicant: Direct Current Capital LLC, Wilmington, DE (US)

(72) Inventors: Carol Reiley, Mountain View, CA (US); Fabien Blanc-Paques, Mountain View, CA (US); Vineet Jain, Mountain View, CA (US); Tory Smith, Mountain View, CA (US); Gahl Levy, Mountain View, CA (US); Caitlin A. Surakitbanharn, Mountain View, CA (US); Chip J. Alexander, Mountain View, CA (US)

(*) Notice: Subject to any disclaimer, the term of this patent is extended or adjusted under 35 U.S.C. 154(b) by 103 days.

(21) Appl. No.: 16/234,307

(22) Filed: Dec. 27, 2018

(65) Prior Publication Data
US 2019/0197325 A1   Jun. 27, 2019

Related U.S. Application Data

(60) Provisional application No. 62/610,696, filed on Dec. 27, 2017.

(51) Int. Cl.
| G06K 9/00 | (2006.01) |
| G05D 1/00 | (2006.01) |
| G08B 21/24 | (2006.01) |
| G08B 13/196 | (2006.01) |
| G08B 5/36 | (2006.01) |
| G08B 3/10 | (2006.01) |

(52) U.S. Cl.
CPC ....... *G06K 9/00832* (2013.01); *G05D 1/0088* (2013.01); *G08B 3/10* (2013.01); *G08B 5/36* (2013.01); *G08B 13/19602* (2013.01); *G08B 21/24* (2013.01); *G05D 2201/0213* (2013.01)

(58) Field of Classification Search
CPC .... G06K 9/00832; G05D 1/0088; G08B 3/10; G08B 5/36; G08B 13/19602; G08B 21/24
See application file for complete search history.

(56) References Cited

U.S. PATENT DOCUMENTS

| 6,144,293 A | 11/2000 | Plaschko et al. |
| 6,271,745 B1 | 8/2001 | Anzai et al. |
| 6,505,780 B1 | 1/2003 | Yassin et al. |
| 6,992,562 B2 | 1/2006 | Fuks et al. |
| 7,146,129 B2 | 12/2006 | Bostrom |
| 7,672,666 B2 | 3/2010 | Hasan |
| 7,698,078 B2 | 4/2010 | Kelty et al. |
| 7,821,383 B2 | 10/2010 | Sultan et al. |

(Continued)

*Primary Examiner* — Mia M Thomas
(74) *Attorney, Agent, or Firm* — Polsinelli PC

(57) ABSTRACT

Systems and methods disclosed herein involve monitoring an interior state of a vehicle. A pre-ride image of an interior is recorded prior to initiating a ride A post-ride image of the interior is recorded following completion of the ride. A region of the post-ride image differing from the pre-ride image is detected, with the region of the post-ride image representing a change in the interior. A type of an object depicted in the region of the post-ride image is classified based on features extracted from the region of the post-ride image. In response to classifying the object depicted in the region of the post-ride image as a personal item, a prompt is served to the user to retrieve the object.

20 Claims, 5 Drawing Sheets

(56) References Cited

U.S. PATENT DOCUMENTS

| | | | |
|---|---|---|---|
| 7,928,829 B2 | 4/2011 | Hermann | |
| 8,024,116 B2* | 9/2011 | Terao | G01C 21/3685 |
| | | | 701/417 |
| 8,121,347 B2* | 2/2012 | Metaxas | G06K 9/00315 |
| | | | 382/103 |
| 8,207,860 B2* | 6/2012 | Enegren | A61B 5/1112 |
| | | | 340/573.1 |
| 8,299,895 B2 | 10/2012 | Harris | |
| 8,634,822 B2 | 1/2014 | Silver et al. | |
| 8,736,438 B1 | 5/2014 | Vasquez et al. | |
| 8,937,528 B2 | 1/2015 | Protopapas | |
| 8,947,202 B2 | 2/2015 | Tucker et al. | |
| 9,035,780 B2* | 5/2015 | Sah | A61B 5/1116 |
| | | | 340/576 |
| 9,218,814 B2 | 12/2015 | Xiong | |
| 9,351,102 B2 | 5/2016 | Tucker et al. | |
| 9,405,363 B2* | 8/2016 | Hernandez-Abrego | |
| | | | G06F 3/005 |
| 9,769,616 B1 | 9/2017 | Pao et al. | |
| 9,855,926 B2* | 1/2018 | Stauffer | B60N 3/048 |
| 9,911,166 B2* | 3/2018 | Reid | G16H 10/60 |
| 9,950,708 B1* | 4/2018 | Cullinane | B60W 30/09 |
| 10,065,658 B2* | 9/2018 | Deligianni | B60W 50/087 |
| 10,104,525 B1 | 10/2018 | Kaiser et al. | |
| 10,202,100 B1 | 2/2019 | Tucker et al. | |
| 10,227,063 B2* | 3/2019 | Abreu | B60H 1/00742 |
| 10,248,119 B2 | 4/2019 | Kentley-Klay et al. | |
| 10,311,704 B1* | 6/2019 | Xu | G06K 9/4628 |
| 10,336,294 B2 | 7/2019 | Grossmann | |
| 10,482,226 B1 | 11/2019 | Konrardy et al. | |
| 10,853,629 B2 | 12/2020 | Blanc-Paques et al. | |
| 10,974,829 B2* | 4/2021 | Myslinski | G05D 1/0094 |
| 2002/0118579 A1 | 8/2002 | Lucy et al. | |
| 2003/0204290 A1 | 10/2003 | Sadler et al. | |
| 2003/0231550 A1 | 12/2003 | Macfarlane | |
| 2005/0001028 A1 | 1/2005 | Zuili | |
| 2006/0267407 A1 | 11/2006 | Nagaoka et al. | |
| 2006/0267781 A1* | 11/2006 | Coulter | G01C 21/3679 |
| | | | 340/573.7 |
| 2010/0087987 A1 | 4/2010 | Huang et al. | |
| 2010/0091995 A1 | 4/2010 | Chen et al. | |
| 2010/0211770 A1 | 8/2010 | Alrabady et al. | |
| 2010/0262348 A1 | 10/2010 | Nallapa et al. | |
| 2011/0119734 A1 | 5/2011 | Crawford | |
| 2011/0264304 A1 | 10/2011 | Burzio | |
| 2012/0075059 A1 | 3/2012 | Fyke et al. | |
| 2013/0030882 A1 | 1/2013 | Davis, III et al. | |
| 2013/0104203 A1 | 4/2013 | Davis et al. | |
| 2013/0143594 A1 | 6/2013 | Ghabra et al. | |
| 2013/0204455 A1 | 8/2013 | Chia et al. | |
| 2013/0332007 A1 | 12/2013 | Louboutin | |
| 2014/0070917 A1 | 3/2014 | Protopapas | |
| 2014/0089143 A1 | 3/2014 | Dione | |
| 2014/0162598 A1* | 6/2014 | Villa-Real | G06Q 20/363 |
| | | | 455/411 |
| 2015/0032621 A1 | 1/2015 | Kar et al. | |
| 2015/0045013 A1 | 2/2015 | Simmons | |
| 2015/0048927 A1 | 2/2015 | Simmons | |
| 2015/0199685 A1 | 7/2015 | Betancourt et al. | |
| 2015/0210287 A1 | 7/2015 | Penilla et al. | |
| 2015/0241241 A1 | 8/2015 | Cudak et al. | |
| 2015/0379793 A1 | 12/2015 | Murakami | |
| 2016/0171574 A1 | 6/2016 | Paulucci et al. | |
| 2016/0209489 A1 | 7/2016 | Schrabler et al. | |
| 2016/0332535 A1* | 11/2016 | Bradley | G06Q 50/30 |
| 2017/0021282 A1* | 1/2017 | Comploi | B60W 50/10 |
| 2017/0080900 A1* | 3/2017 | Huennekens | B60W 40/08 |
| 2017/0091856 A1* | 3/2017 | Canberk | G06Q 30/0609 |
| 2017/0126810 A1* | 5/2017 | Kentley | G06Q 50/30 |
| 2017/0153714 A1* | 6/2017 | Gao | G06K 9/00805 |
| 2017/0247040 A1* | 8/2017 | Miller | B60W 30/182 |
| 2017/0270490 A1* | 9/2017 | Penilla | G06Q 10/06314 |
| 2017/0330044 A1* | 11/2017 | Telpaz | B60K 35/00 |
| 2018/0126960 A1* | 5/2018 | Reibling | G05D 1/021 |
| 2018/0215392 A1* | 8/2018 | Kosaka | G05D 1/0061 |
| 2018/0356830 A1* | 12/2018 | Haghighat | B60W 10/04 |
| 2018/0364723 A1* | 12/2018 | Cullinane | G06K 9/00832 |
| 2018/0365400 A1 | 12/2018 | Lopez-Hinojosa et al. | |
| 2019/0039570 A1 | 2/2019 | Foster et al. | |
| 2019/0063942 A1* | 2/2019 | Kang | G05D 1/0223 |
| 2019/0176837 A1* | 6/2019 | Williams | B60W 50/02 |
| 2019/0297450 A1 | 9/2019 | Hwang et al. | |
| 2019/0318159 A1 | 10/2019 | Blanc-Paques et al. | |
| 2019/0369636 A1* | 12/2019 | Nishiyama | G05D 1/0246 |
| 2019/0389486 A1* | 12/2019 | Murad | G01V 8/10 |
| 2019/0391250 A1* | 12/2019 | Cohen | G01S 13/58 |
| 2020/0005059 A1* | 1/2020 | Yamada | G01C 21/36 |
| 2020/0010051 A1 | 1/2020 | Dumov | |
| 2020/0012979 A1* | 1/2020 | Song | G05D 1/0088 |
| 2020/0043063 A1* | 2/2020 | London | G06Q 30/0281 |
| 2020/0057487 A1 | 2/2020 | Sicconi | |
| 2020/0094963 A1* | 3/2020 | Myslinski | G08B 21/18 |
| 2020/0117929 A1* | 4/2020 | Moon | G06K 9/38 |
| 2020/0124428 A1* | 4/2020 | Hamilton | G01C 21/3438 |
| 2020/0223454 A1* | 7/2020 | Fox | G06K 9/00832 |
| 2020/0293799 A1* | 9/2020 | Herman | G06K 9/6202 |
| 2021/0110182 A1* | 4/2021 | Darnaud | B60W 50/14 |

\* cited by examiner

METHOD FOR MONITORING AN INTERIOR STATE OF AN AUTONOMOUS VEHICLE

CROSS-REFERENCE TO RELATED APPLICATIONS

This Application claims the benefit of U.S. Provisional Application No. 62/610,696, filed on 27 Dec. 2017, which is incorporated in its entirety by this reference.

TECHNICAL FIELD

This invention relates generally to the field of autonomous vehicles and more specifically to a new and useful method for monitoring an interior state of an autonomous vehicle in the field of autonomous vehicles.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1:
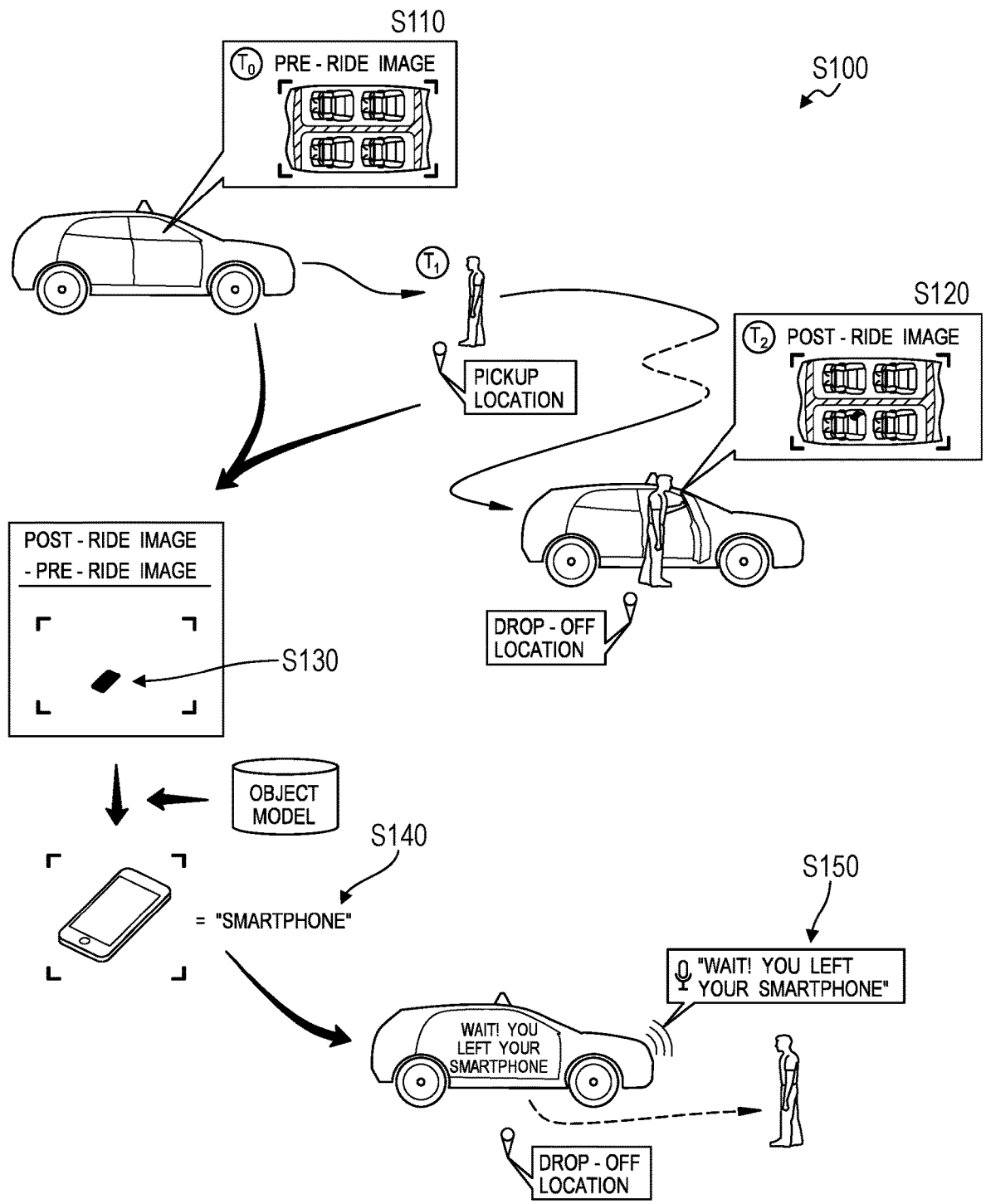
FIG. 1 is a flowchart representation of a method.
Figure 5:
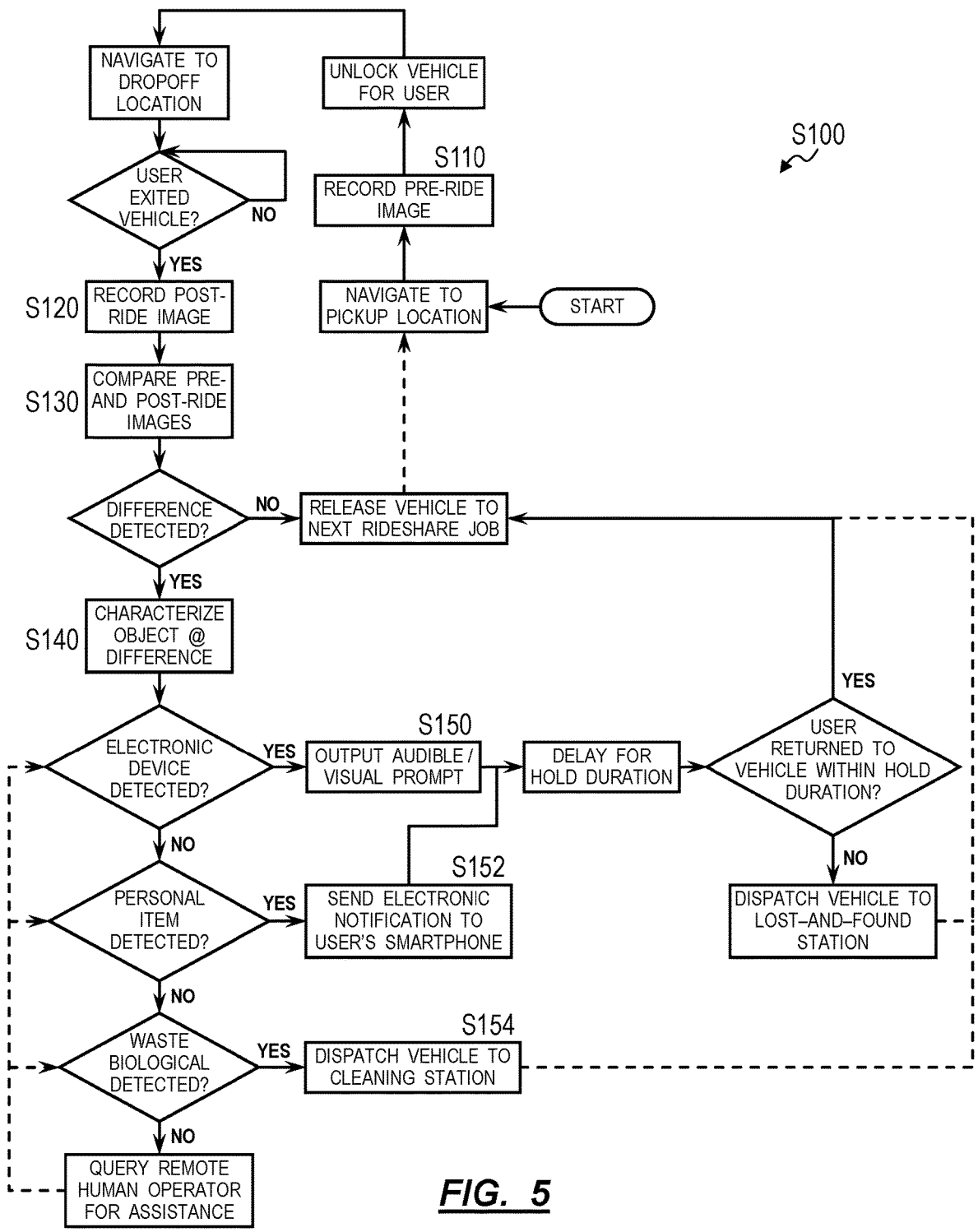
FIG. 5 is a flowchart representation of one variation of the method.

As shown in FIGS. 1 and 5, a method for monitoring an interior state of an autonomous vehicle includes: at the autonomous vehicle, recording a pre-ride image of an interior of the autonomous vehicle prior to entry of a user into the autonomous vehicle in Block S110; in response to the user exiting the autonomous vehicle following arrival at a destination specified by the user, recording a post-ride image of the interior of the autonomous vehicle in Block S120; comparing the post-ride image to the pre-ride image to identify a region of the post-ride image representing a change in the interior of the autonomous vehicle following occupancy of the user in the autonomous vehicle in Block S130; implementing an object model to classify an object depicted in the region of the post-ride image as one of an electronic device, a bag, and waste in Block S140; in response to classifying the object depicted in the region of the post-ride image as an electronic device, rendering a prompt on an exterior display of the autonomous vehicle to return to the autonomous vehicle to collect the electronic device from the autonomous vehicle in Block S150; in response to classifying the object depicted in the region of the post-ride image as a bag, transmitting an electronic notification to a mobile computing device associated with the user in Block S152, the electronic notification including a prompt to retrieve the bag from the autonomous vehicle; and, in response to classifying the object depicted in the region of the post-ride image as waste, dispatching the autonomous vehicle to a cleanup location in Block S154.

One variation of the method includes: at an autonomous vehicle, recording a pre-ride image of an interior of the autonomous vehicle prior to initiating a ride in Block Silo; following completion of the ride, recording a post-ride image of the interior of the autonomous vehicle in Block S120; detecting a region of the post-ride image differing from the pre-ride image in Block S130, the region of the post-ride image representing a change in the interior of the autonomous vehicle following occupancy of the autonomous vehicle by a user; classifying a type of an object depicted in the region of the post-ride image based on features extracted from the region of the post-ride image in Block S140; and, in response to classifying the object depicted in the region of the post-ride image as a personal item, serving a prompt to the user to retrieve the object from the autonomous vehicle in Block S150.

2. Applications

Generally, Blocks of the method can be executed by an autonomous rideshare vehicle and/or by a remote computer system (e.g., a remote rideshare dispatcher): to automatically detect and identify an object left inside the autonomous vehicle by a rider (hereinafter a "user") upon her departure from the autonomous vehicle at a destination location; and to selectively prompt the user to return to the autonomous vehicle to collect this object based on a determined type of the object. In particular, the autonomous vehicle can record a pre-ride image (e.g., a color photographic image, a distance scan, etc.) of its interior prior to a user entering the autonomous vehicle at a pickup location and record a post-ride image once the user exits the autonomous vehicle at a destination location. The autonomous vehicle (or the remote computer system) can then: compare the pre- and post-ride images to identify a region of the post-ride image that represents a change within the interior of the autonomous vehicle that occurred during the user's occupation of the autonomous vehicle; and implement object recognition or other computer vision techniques to identify a type of the object represented by this region of the post-ride image, such as: an electronic device (e.g., a smartphone); a bag; a purse; a box; an umbrella; trash (e.g., a drink bottle or food wrapper); or other waste (e.g., vomit); etc.

Upon identifying an object left by the user inside the autonomous vehicle and determining a type of the object, the autonomous vehicle (or the remote computer system) can selectively prompt the user to return to the autonomous vehicle to collect this object through a particular communication mode based on the type of the object. For example, if the autonomous vehicle identifies the object as a bag, purse, umbrella, or other non-electronic personal item, the autonomous vehicle (or the remote computer system) can transmit a text message or other electronic notification to the user's smartphone or initiate an automated call to the user's smartphone to prompt the user to return to the autonomous vehicle since the user may still be carrying her smartphone despite leaving a bag or other personal item in the autonomous vehicle. However, if the autonomous vehicle identifies the object as a smartphone or other mobile computing device, the autonomous vehicle can: render a notification on an exterior-facing display and/or output an audible alarm through an external speaker on the autonomous vehicle to prompt the user to return to the autonomous vehicle; rather than transmit an electronic notification or initiate a phone call to the user's smartphone since the user may be currently separated from her smartphone. Similarly, if the autonomous vehicle identifies the object as trash, such as a water bottle or food wrapper, the autonomous vehicle (or the remote computer system) can transmit an electronic notification to the user's smartphone, initiate an automated call to the user's smartphone, and/or serve an audible and/or visual alarm at the autonomous vehicle to prompt the user to return to the autonomous vehicle to retrieve her trash. In this example, the autonomous vehicle (and/or the remote computer system) can execute Blocks of the method rapidly to: identify an item left inside the autonomous vehicle by a last user, such as within seconds of the user exiting the autonomous vehicle; hold at the destination location for some period of time (e.g., 45 seconds) and/or until a next rideshare job is assigned to the autonomous vehicle; and permit the user to regain access to the autonomous vehicle's interior and retrieve this item as the autonomous vehicle waits at the destination location. However, in this example, if the autonomous vehicle identifies the object in its interior to be spilled food or liquid (e.g., an unknown liquid, biological waste), the autonomous vehicle can immediately autonomously navigate to a nearest cleaning station for cleaning rather than prompt the user—now outside of the autonomous vehicle—to return to the autonomous vehicle to clean this spill. Similarly, the autonomous vehicle can autonomously navigate to a nearest lost-and-found station for manual removal of a personal item before autonomously navigating to a pickup location designated in a next ride request by a next user: if the user fails to retrieve a personal item from the autonomous vehicle despite prompting (e.g., with a pre-recorded phone call, text message, or email to the user's smartphone or via a visual prompt rendered on the exterior of the autonomous vehicle) within a maximum wait duration; or if the user responds to this prompt by confirming later retrieval of the personal item from the lost-and-found station.

The autonomous vehicle and/or the remote computer system can thus execute Blocks of the method: to identify objects left in the autonomous vehicle following arrival at a destination location designated by a user; to selectively inform the user through various communication pathways of the object left inside the autonomous vehicle, such as based on the determined type of the object; and to selectively dispatch the autonomous vehicle to a lost-and-found station, cleaning station, or other maintenance location based on the type of the object and/or the based on the user's response to the prompt. By thus executing the method, the autonomous vehicle and/or the remote computer system can: reduce instances in which users leave personal items in the autonomous vehicle; reduce frequency of trips to a lost-and-found station by the autonomous vehicle and thus maintain high operating efficiency of the autonomous vehicle over time (e.g., a high ratio of paid trips completed or paid miles driven per unit time in operation); prevent theft of an object—left in the autonomous vehicle by one user—by a next rider; and/or ensure a clean interior environment for subsequent riders by selectively navigating to a cleaning station if a spill or debris is detected in the autonomous vehicle following conclusion of a ride; without involvement of a local or remote human operator to oversee operation of the autonomous vehicle.

In particular, because the autonomous vehicle operates autonomously and without presence of a human operator inside the autonomous vehicle to oversee users entering and exiting the autonomous vehicle, to call users to retrieve forgotten items, or to clean the autonomous vehicle's interior when soiled, the autonomous vehicle (and/or the remote computer system) can execute Blocks of the method in order to achieve a comparable experience and comparable results for riders.

Blocks of the method S100 are described herein as executed locally by the autonomous vehicle while the autonomous vehicle executes rides (or "rideshare jobs"), such as by: autonomously navigating to pickup locations specified in ride requests received from users, collecting users at these pickup locations, and autonomously navigating to destination locations specified in corresponding ride requests. However, Blocks of the method S100 can additionally or alternatively be executed by a remote computer system—such as a remote server or computer network executing remote rideshare dispatcher functions—to detect, identify, and respond to objects left inside the autonomous vehicle by a user upon exiting the autonomous vehicle. For example, the autonomous vehicle can: collect optical data through a camera or other optical sensor arranged within the autonomous vehicle's interior; and return these optical data to the remote computer system via a wireless (e.g., cellular) network. In this example, the remote computer system can: remotely process these optical data to detect and identify an object left in the autonomous vehicle by a last user; and then selectively transmit an electronic notification (e.g., a text message, an in-application notification) to the user's smartphone, initiate an automated call to the user's smartphone, trigger the autonomous vehicle to initiate an audible and/or visual alarm, dispatch the autonomous vehicle to a cleaning or lost-and-found station, and/or queue the autonomous vehicle to execute a next rideshare job.

Furthermore, the method is described herein as executed by the autonomous vehicle and/or the remote computer system to detect and respond to objects left in the passenger compartment of the autonomous vehicle. However, the autonomous vehicle and/or the remote computer system can implement similar methods and techniques to detect and respond to objects left inside of the autonomous vehicle's trunk or other storage location within the autonomous vehicle, such as based on pre-ride and post-ride images recorded by an optical sensor arranged in a trunk area of the autonomous vehicle.

3. Autonomous Vehicle: Autonomous Navigation

The autonomous vehicle can include: a suite of sensors configured to collect information about the autonomous vehicle's environment; local memory storing a navigation map defining a route for execution by the autonomous vehicle and a localization map that the autonomous vehicle implements to determine its location in real space; and a controller. The controller can: determine the location of the autonomous vehicle in real space based on sensor data collected from the suite of sensors and the localization map; determine the context of a scene around the autonomous vehicle based on these sensor data; elect a future action (e.g., a navigational decision) based on the context of the scene around the autonomous vehicle, the real location of the autonomous vehicle, and the navigation map, such as further based on a deep learning and/or artificial intelligence model; and control actuators within the autonomous vehicle (e.g., accelerator, brake, and steering actuators) according to elected decisions.

In one implementation, the autonomous vehicle includes one or more 360° LIDAR sensors arranged on the top of the autonomous vehicle, such as at each of the front and rear of the autonomous vehicle. Each LIDAR sensor can output one three-dimensional distance map—such as in the form of a 3D point cloud representing distances between the LIDAR sensor and the external surface within the field of view of the LIDAR sensor—per rotation of the LIDAR sensor (i.e., once per scan cycle). The autonomous vehicle can additionally or alternatively include: a set of infrared emitters configured to project structured light into a field near the autonomous vehicle; a set of infrared detectors (e.g., infrared cameras); and a processor configured to transform images output by the infrared detector(s) into a depth map of the field. The autonomous vehicle can also include one or more color cameras facing outwardly from the front, rear, and left lateral and right lateral sides of the autonomous vehicle. For example, each camera can output a video feed containing a sequence of digital photographic images (or "frames"), such as at a rate of 20 Hz. Furthermore, the autonomous vehicle can include a set of infrared proximity sensors arranged along the perimeter of the base of the autonomous vehicle and configured to output signals corresponding to proximity of objects and pedestrians within one meter of the autonomous vehicle.

The autonomous vehicle can also implement one or more local neural networks to process LIDAR feeds (i.e., sequences of LIDAR images), video feeds (or sequences of color photographic images), and/or other sensor data substantially in real-time in order to localize the autonomous vehicle to a known location and orientation in real space, to interpret (or "perceive") its surroundings, and to then select and execute navigational actions. For example, a controller integrated into the autonomous vehicle can: pass LIDAR and video feeds into a localization/perception neural network to detect and characterize static objects—such as lane markers, lane reflectors, curbs, road signs, telephone poles, and building facades—near the autonomous vehicle substantially in real-time; and then compare types and relative locations of these static objects to a localization map to determine the autonomous vehicle's position in real space. In this example, the neural network can also detect and characterize dynamic objects—such as other vehicles, pedestrians, and cyclists—in the LIDAR and video feeds; and the controller can perceive the autonomous vehicle's local environment based on proximity, speed, and types of these nearby dynamic objects. The controller can then select a next navigational action—such as including a target wheel angle, road speed, acceleration, or deceleration (e.g., brake position)—to move toward a specified destination based on the autonomous vehicle's current position and the scene around the autonomous vehicle, such as by passing the autonomous vehicle's position, identified dynamic objects in the local scene, and the autonomous vehicle's destination into a navigational model (e.g., a navigating neural network).

The autonomous vehicle can therefore implement one or more neural networks locally to determine its location, perceive its surroundings, and select future actions. The remote computer system can implement Blocks of the method S100: to collect LIDAR, video, and/or other optical data from the autonomous vehicle, other autonomous vehicles, and/or manually-operated road vehicles with similar sensor suites; to interface with human annotators to attribute localization-, perception-, and motion planning-related labels to these optical data; and to generate and refine localization/perception, navigational, and/or other neural networks—for implementation by these autonomous vehicles—over time. However, the autonomous vehicle can include any other type or arrangement of sensors and can implement any other methods or techniques to autonomously navigate public and private streets, alleys, and other roadways.

4. Autonomous Vehicle: Interior Sensors

The autonomous vehicle also includes one or more optical sensors configured to capture data representative of an interior state of the autonomous vehicle.

In one implementation, the autonomous vehicle includes a camera (e.g., a color RGB camera) with a wide-angle lens defining a field of view directed toward the autonomous vehicle's interior, such as toward seat areas, footwells, and a center console in the passenger compartment of the autonomous vehicle. For example, the autonomous vehicle can include one or more such cameras: coupled to an interior ceiling and directed downward; and/or coupled to the dashboard of the autonomous vehicle and directed rearward toward the autonomous vehicle's passenger compartment. In another example, the autonomous vehicle includes a camera integrated into a housing of an overhead interior map light within the autonomous vehicle's interior. The autonomous vehicle can additionally or alternatively include one or more depth sensors (e.g., a LIDAR or structured light sensors) arranged inside the passenger compartment, such as paired with a 2D color camera.

In one implementation in which the autonomous vehicle includes multiple optical sensors, these optical sensors can be arranged inside the autonomous vehicle such that their fields of view cooperatively cover a large proportion of the seat areas, footwells, and center console within the passenger compartment. When executing Block S110, the autonomous vehicle can trigger each optical sensor to record a discrete pre-ride image and then stitch these discrete pre-ride images into a composite 2D or 3D pre-ride image based on known relative positions of the optical sensors. In Block S120, the autonomous vehicle can similarly trigger each optical sensor to record a discrete post-ride image and then stitch these discrete post-ride images into a composite 2D or 3D post-ride image. The autonomous vehicle (or the remote computer system) can then process these composite pre- and post-ride images in subsequent Blocks of the method to detect an object left in the autonomous vehicle following conclusion of a ride. Alternatively, the autonomous vehicle can individually process discrete pre- and post-ride image pairs—recorded by individual optical sensors—in subsequent Blocks of the method to detect and identify objects left in regions of the autonomous vehicle's interior that fall in the fields of view of these optical sensors.

However, the autonomous vehicle can include any other type or combination of optical sensors arranged in any other way and can prepare pre-ride and post-ride images recorded with this set of optical sensors in any other way prior to processing in Blocks S130 and S140.

5. Pre-Ride Image

Block S110 of the method recites, at an autonomous vehicle, recording a pre-ride image of an interior of the autonomous vehicle prior to entry of a user into the autonomous vehicle. Generally, in Block S110, the autonomous vehicle records an optical image (e.g., a color photographic image and/or a depth scan image) of the interior of the autonomous vehicle prior to a user entering the autonomous vehicle; the pre-ride image can thus represent a state of the autonomous vehicle's interior at a time just before the user first enters the autonomous vehicle.

In one implementation, the autonomous vehicle records a pre-ride image in Block S110 once the autonomous vehicle has stopped at a pickup location designated by a user (e.g., in a ride request) and before the user enters the autonomous vehicle (e.g., before the autonomous vehicle automatically unlocks its door to permit the user entry to the autonomous vehicle). Alternatively, the autonomous vehicle can store a post-ride image recorded during a last rideshare job as the pre-ride image for the current rideshare job. For example, by recording the pre-ride image prior to the user entering the autonomous vehicle (and later recording the post-ride image after the user exits the autonomous vehicle, such as described below), the autonomous vehicle may preserve the user's privacy (i.e., not record an image of the user or other occupants of the autonomous vehicle directly) during a ride.

Furthermore, for the optical sensor that includes a color camera, the autonomous vehicle can control interior lighting conditions during recordation of the pre-ride image in order to limit lighting differences between this pre-ride image and the subsequent post-ride image. For example, when recording the pre-ride image in Block S110, the autonomous vehicle can activate all interior lighting (e.g., all overhead and other map lights) within the autonomous vehicle or trigger one or more flash modules within the autonomous vehicle; the autonomous vehicle can implement the same process when recording the post-ride image in Block S120.

In another example, the autonomous vehicle can predict a lighting condition at the user-specified destination location and then approximate this lighting condition at the autonomous vehicle when recording the pre-ride image. In this example, the autonomous vehicle can: estimate a time of arrival of the autonomous vehicle at the user's designated destination location; estimate a general lighting condition near the destination location based on a known position of the sun and forecast local weather conditions at the destination location at the estimated time of arrival; and correct the general lighting condition in this geographic region based on known positions and sizes of buildings adjacent the destination location. As the autonomous vehicle autonomously navigates a planned route toward the user's designated pickup location, the autonomous vehicle can: implement similar methods and techniques to identify a target location—along this route—that may exhibit lighting conditions similar to those predicted at the destination location; and then automatically record the pre-ride image in Block Silo as the autonomous vehicle passes this target location or stop at this target location, record the pre-ride image, and then resume navigation along the route toward the pickup location.

Alternatively, the autonomous vehicle can access a prerecorded, generic, or template image of its interior and compare this pre-recorded image to the post-ride image recorded in Block S120 to detect changes in the interior of the autonomous vehicle in Block S130.

6. Post-Ride Image

Block S120 of the method recites, in response to the user exiting the autonomous vehicle following arrival at a destination specified by the user, recording a post-ride image of the interior of the autonomous vehicle. Generally, in Block S120, the autonomous vehicle can implement methods and techniques similar to those of Block S110 to record a post-ride image upon conclusion of the current rideshare job.

For example, the autonomous vehicle can record the post-ride image in Block S120 in response to arrival of the autonomous vehicle at the destination location and in response to: the user opening a door of the autonomous vehicle; the user opening at least one door and followed by all doors and the trunk of the autonomous vehicle returning to a closed state; or a last occupant exiting the autonomous vehicle (i.e., if the user who requested the autonomous vehicle is traveling with other individuals).

In a similar example, the autonomous vehicle can: autonomously navigate to a pickup location specified in a ride request submitted by a user; record the pre-ride image—via the interior-facing camera—prior to unlocking doors of the autonomous vehicle for the user upon arrival at the pickup location; initiate the ride once the user enters the autonomous vehicle (and confirms departure); autonomously navigate to a destination location specified in the ride request; monitor states of seat sensors and door sensors in the autonomous vehicle to detect the user exiting the autonomous vehicle (e.g., when at least one door of the autonomous vehicle is open and a seat sensor transitions from detecting presence of a body to absence of a body) following arrival of the autonomous vehicle at the destination location; and then record the post-ride image once departure of the user from the autonomous vehicle is detected. The autonomous vehicle can thus record the post-ride image as the user exits the autonomous vehicle in Block S120, detect an object left in the autonomous vehicle based on the post-ride image in Blocks S130 and S140, and notify the user of the object in Block S150 before the user closes her door and moves away from the autonomous vehicle.

Alternatively, the autonomous vehicle can record the post-ride image once the user (and all other riders) have exited the autonomous vehicle and all doors to the passenger compartment of the autonomous vehicle are closed, which may: indicate the user's intention to walk away from the autonomous vehicle; reduce probability that the user is captured in the post-ride image (e.g., if the user is leaning into the passenger compartment to retrieve her belongings after stepping out of the autonomous vehicle), which may trigger the autonomous vehicle to issue a false positive prompt to retrieve a personal item; and/or yield more consistent lighting or enable the user to better control lighting inside the autonomous vehicle when recording the post-ride image.

However, the autonomous vehicle can execute Block S120 to record the post-ride image in response to any other trigger following arrival at the specified destination in order to record a state of the autonomous vehicle's interior at the conclusion of this ride.

Furthermore, when recording the post-ride image in Block S120, the autonomous vehicle can also replicate interior lighting conditions under which the pre-ride image was recorded in Block S110, as described above.

7. Variation: Video Stream

In one variation, the autonomous vehicle records: a video feed (e.g., a continuous color video) of the interior of the autonomous vehicle (e.g., the passenger compartment of the autonomous vehicle) via the interior camera during operation; and extracts the pre-ride image and the post-ride image from this video feed. For example, the autonomous vehicle can record one continuous video per ride, including: initiating recordation of the video upon arrival at a pickup location prior to unlocking its doors for a user; continuing recordation of the video though autonomous navigation to the user's specified destination; and concluding recordation of the video once the autonomous vehicle departs from the specified destination toward a pickup location of a next ride. In this example, the autonomous vehicle can: select a first color photographic frame—in the video feed—recorded prior to entry of the user into the autonomous vehicle; and select a second color photographic frame—in the video feed—recorded following exit of the user from the autonomous vehicle, such as according to triggers described above.

However, the autonomous vehicle can implement any other method or technique to record and store a pre-ride image and post-ride image for a ride performed by the autonomous vehicle and according to any other trigger(s).

8. Object Detection

Block S130 of the method recites comparing the post-ride image to the pre-ride image to identify a region of the post-ride image representing a change in the interior of the autonomous vehicle following occupancy of the user in the autonomous vehicle. Generally, in Block S130, the autonomous vehicle (or the remote computer system) detects differences between the pre- and post-ride images, which may indicate changes in the autonomous vehicle's interior between the beginning and conclusion of this rideshare job. In particular, the post-ride image made differ from the pre-ride image where an electronic device, bag, purse, trash, or waste, etc. was left on a seat, in a footwell, or in a center console of the autonomous vehicle by the user upon exiting the autonomous vehicle; the autonomous vehicle can thus detect possibility of such objects remaining in the autonomous vehicle by comparing the pre- and post-ride images. (Alternatively, the autonomous vehicle can detect objects left behind within its interior from the post-ride image exclusively, such as by implement object recognition to detect and identify these objects directly from the post-ride image.)

In one implementation in which the autonomous vehicle records the pre- and post-ride images through fixed color cameras within the autonomous vehicle, pixels in the pre- and post-ride images correspond to approximately identical surfaces within the autonomous vehicle's interior if no objects were left behind in the autonomous vehicle following the user's exit. Therefore, color values in corresponding pixels (i.e., pixels with the same address) in the pre- and post-ride images—in regions of these images that represent the autonomous vehicle's interior surfaces that have not changed (e.g., have not been soiled or do not contain abandoned objects or waste) between a first time in which the user entered the autonomous vehicle and a second time in which the user exited the autonomous vehicle—may be substantially similar (if not identical). The autonomous vehicle can therefore execute pixel-to-pixel comparison of the pre- and post-ride images to detect regions in the post-ride image that represent changes to the interior of the autonomous vehicle. The autonomous vehicle can then flag regions of the post-ride image (e.g., clusters of pixel) that exhibit significant deviations in color value from corresponding pixels in the pre-ride image.

In another implementation in which the autonomous vehicle records the pre- and post-ride images through a depth sensor arranged statically inside the autonomous vehicle, the autonomous vehicle (or the remote computer system) can similarly compare depth values stored in corresponding pixels in the pre- and post-ride images. The autonomous vehicle can then flag regions of the post-ride image (e.g., clusters of pixel) that exhibit significant deviations in depth value from corresponding pixels in the pre-ride image, as such changes in depth value (e.g., reduction in distance from the depth sensor) may indicate that a new object is present in the autonomous vehicle's interior.

However, the autonomous vehicle can implement any other method or technique to compare the pre- and post-ride images and to flag differences therebetween, which may indicate presence of a new object in a corresponding location within the autonomous vehicle.

9. Object Identification

Block S140 of the method recites implementing an object model to characterize the region of the post-ride image as one of an electronic device, a bag, and waste. Generally, in Block S140, the autonomous vehicle (or the remote computer system) implements computer vision techniques to identify a type of an object represented in each region of the post-ride image flagged in Block S130.

In one implementation, the autonomous vehicle (or the remote computer system) implements template matching techniques to identify the type of an object in a flagged region of the post-ride image. In this implementation, the autonomous vehicle can access a stored corpus of template images of objects of various types, such as: electronic devices (e.g., smartphones, tablets); bags (e.g., handbags, purses, paper and plastic shopping bags, and other totes); boxes and other packages (e.g., cardboard boxes and gift-wrapped packages); clothing and accessories (e.g., jackets, sweaters, hats); other personal items (e.g., umbrellas); trash (e.g., cups, bottles, food wrappers); biological and other wet waste (e.g., spilled food and drink, vomit); etc. The corpus of template images can also include template images of moveable/mutable vehicle surfaces, such as: reclining seats and armrests; extensible headrests; retractable cup holders; movable air vents; etc.

In the foregoing implementation, for a first flagged region of the post-ride image, the autonomous vehicle can: extract a set of features from the first flagged region of the post-ride image; compare the set of features to template images in the corpus of template images; quantify similarity between the set of features and these template images, such as by calculating a similarity score between the set of features extracted from the first flagged region of the post-ride image and features represented in each template image; and identify a particular template image—in the corpus—that exhibits greatest similarity to the first flagged region (e.g., the template image associated with a greatest similarity score). The autonomous vehicle can then tag the first flagged region of the post-ride image according to an object type (e.g., one of an electronic device, a bag, a box, a purse, a jacket, a hat, a movable interior surface of the autonomous vehicle, or vomit) associated with the particular template image, such as if the similarity score for the particular template image exceeds a preset threshold score. However, if the similarity score for the particular template image does not exceed the preset threshold score, the autonomous vehicle can flag the first region of the post-ride image as "unknown."

Figure 2:
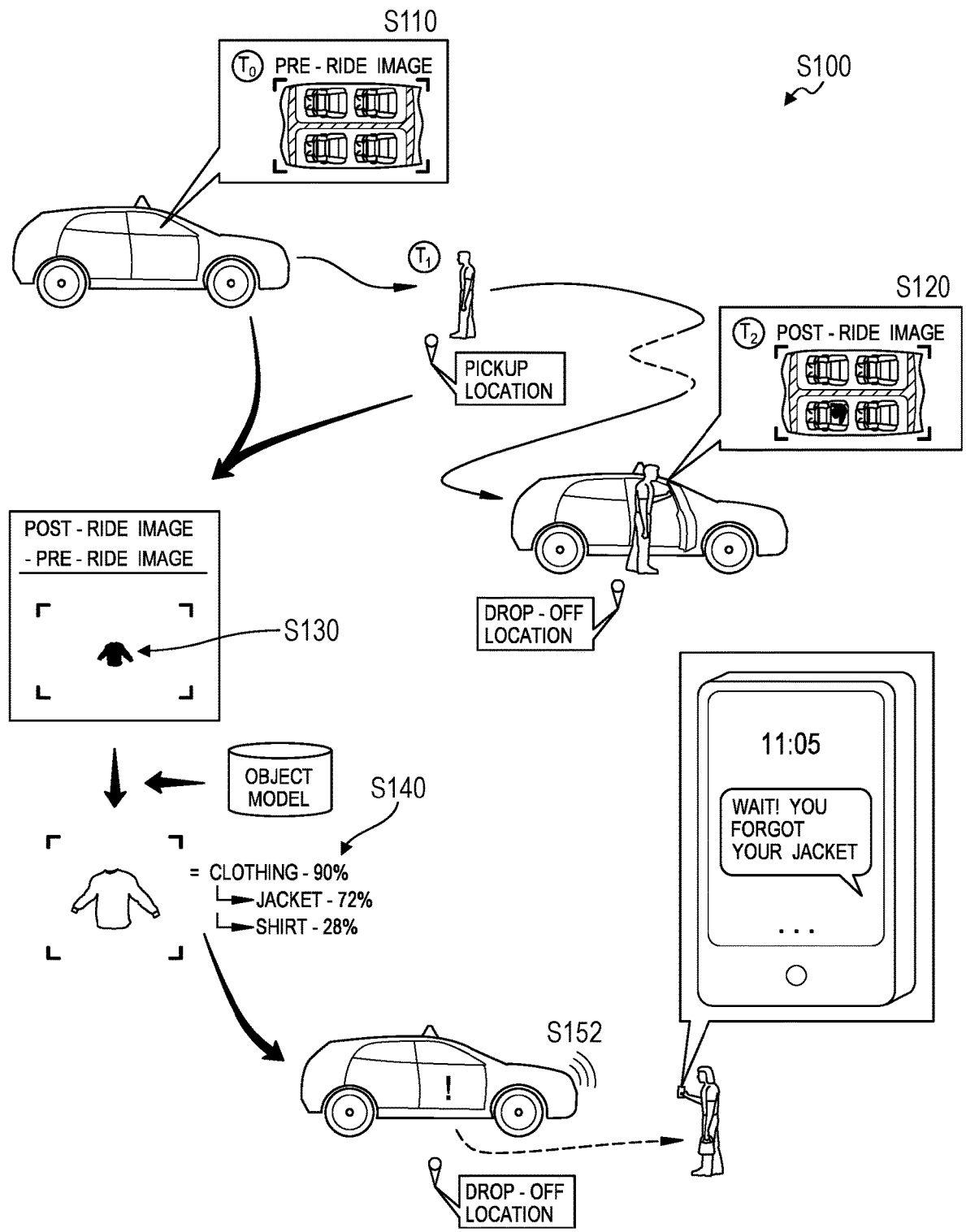
FIG. 2 is a flowchart representation of one variation of the method.
Figure 3:
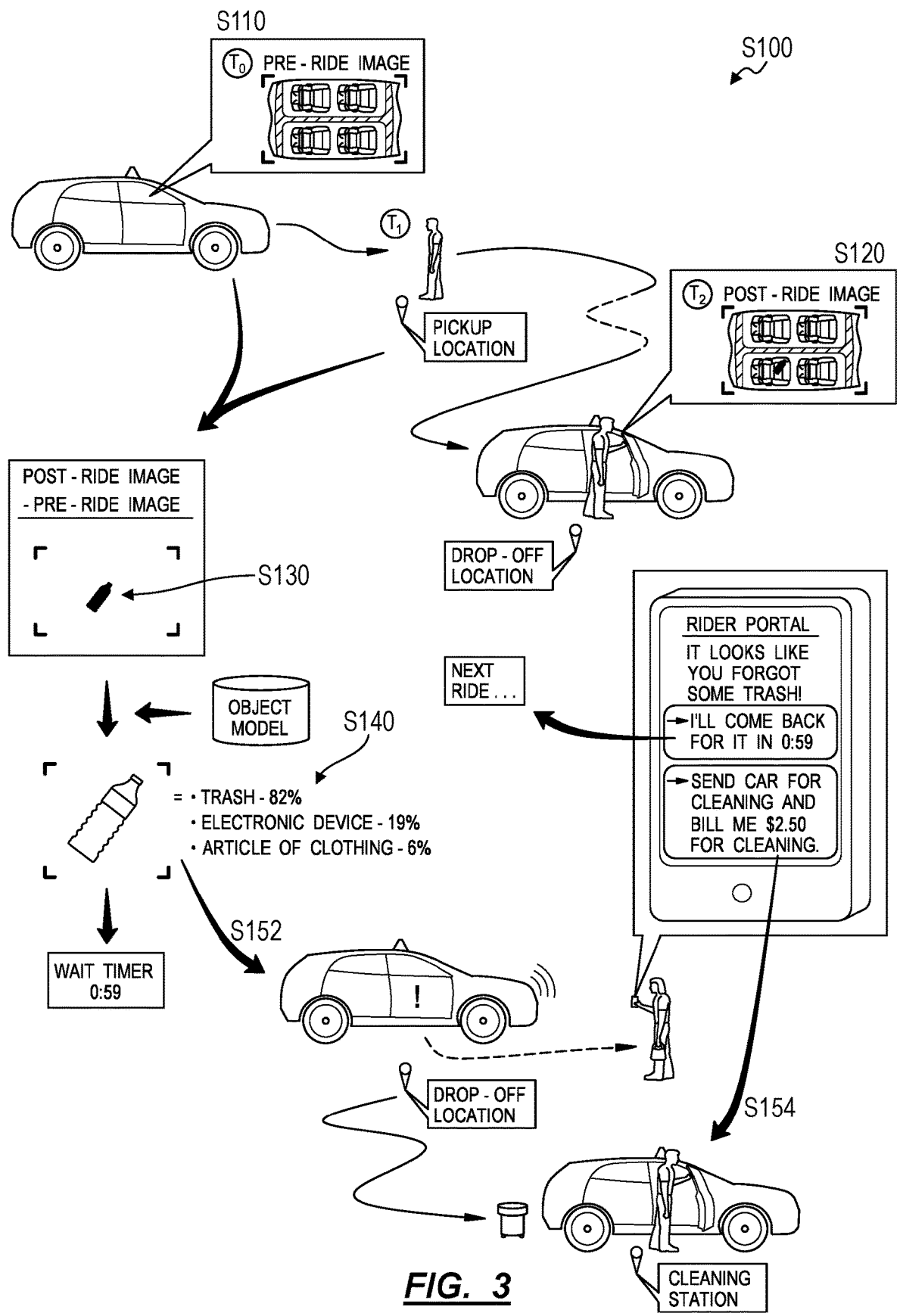
FIG. 3 is a flowchart representation of one variation of the method.
Figure 4:
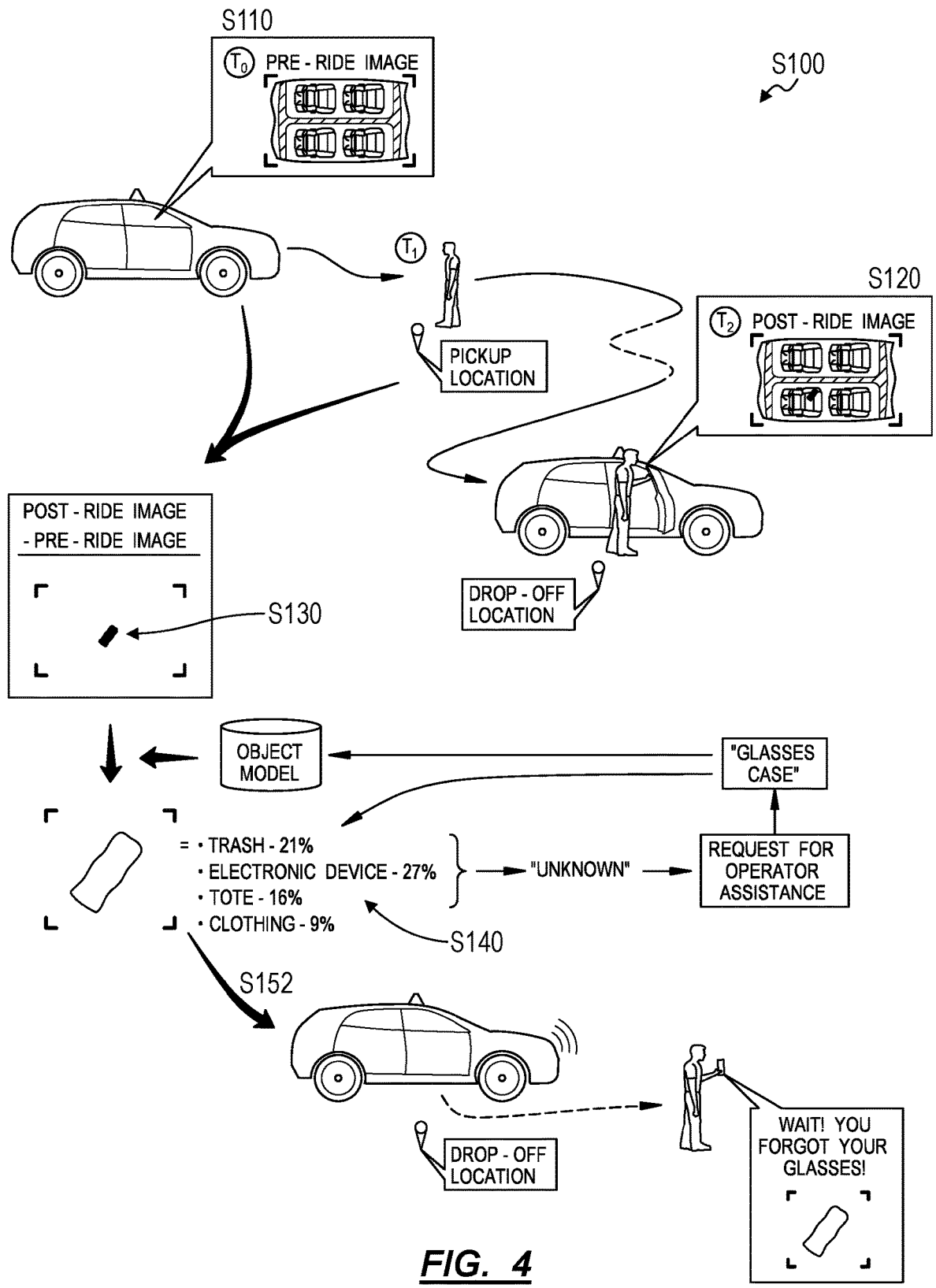
FIG. 4 is a flowchart representation of one variation of the method.

Alternatively, in the implementations described above in which the autonomous vehicle captures both pre- and post-ride images, the autonomous vehicle can implement deep-learning or machine learning methods—such as a recurrent neural network (or "RNN")—to detect anomalies between the pre- and post-ride images and to characterize these anomalies as objects of certain types left inside the autonomous vehicle in Blocks S130 and S140. For example, the autonomous vehicle can isolate a region of the post-ride image that differs from the pre-ride image in Block S130, such as by: normalizing the pre- and post-ride images for a common lighting condition; converting the pre- and post-ride images to grayscale; subtracting the grayscale pre-ride image from the grayscale post-ride image; and isolating a region of the resulting difference image that contains a large number of contiguous non-zero pixel values. In this example, the autonomous vehicle can then: project the boundary of this region on the original post-ride image; extract a set of features from this region of the post-ride image; and calculate a set of confidence scores for classification of the object as a set of object types (e.g., electronic device, bag, purse, article of clothing, food, food packaging, liquid, and vehicle damage) based on the set of features and based on a stored object model, as shown in FIGS. 2, 3, and 4. If the autonomous vehicle calculates a confidence of a particular object type for the object that exceeds a threshold score (e.g., 50%), the autonomous vehicle can predict that the object is of this particular object type in Block S150 and selectively prompt the user to retrieve this object, navigate to a lost-and-found location, or navigate to a maintenance facility accordingly, as described below. For example, the autonomous vehicle can serve a prompt to the user to retrieve the object from the autonomous vehicle if the confidence score for classification of the object as a personal item exceeds both the threshold score and confidence scores for all other object types. Similarly, the autonomous vehicle can automatically navigate to a maintenance facility if the confidence score for classification of the object as vehicle damage exceeds both threshold score and confidence scores for all other object types.

In another implementation, once the autonomous vehicle captures a post-ride image in Block S120, the autonomous vehicle analyzes the post-ride image by implementing machine learning methods—such as a convolutional neural network (or "CNN")—to detect and identify objects within the autonomous vehicle directly and without comparison to a pre-ride image in Blocks S130 and S140.

However, the autonomous vehicle can implement any other object recognition technique, object model, etc. to determine a type of object represented in the first flagged region of the post-ride image. The autonomous vehicle can then repeat this process for each other flagged region in the post-ride image in Block S140.

9.1 Variation: Other Image Types

In one variation, the autonomous vehicle can additionally or alternatively collect pre- and post-ride sensor data of other types in Blocks Silo and S120. For example, the autonomous vehicle can: record pre- and post-ride a thermal images through a thermal imaging sensor arranged within the autonomous vehicle's interior; detect a region of the post-ride image that indicates a change in temperature within the interior of the autonomous vehicle since the pre-ride image was recorded; identify a detected temperature increase in the post-ride image as representing a mobile computing device (e.g., a cellular phone, a laptop) if this temperature increase is characterized by a sharp temperature gradient bounded by a rectilinear area within the post-ride image; identify a detected temperature decrease in the post-ride image as representing a drink container (e.g., a water bottle, a soda can) if this temperature decrease is characterized by a sharp temperature gradient over an area similar in size to a standard drink container; and identify (and ignore) a detected temperature increase on a seat inside the autonomous vehicle as representing the user's seating location inside the autonomous vehicle if this temperature increase exhibits a shallow and diminishing temperature gradient over a short duration of time after the user exits the autonomous vehicle.

In another example, the autonomous vehicle: includes a multispectral imaging sensor that outputs multispectral or hyperspectral images; records hyperspectral pre- and post-ride images in Blocks Silo and S120; and identifies types of objects left inside the autonomous vehicle as a function of dominant frequencies of groups of pixels in regions of the hyperspectral post-ride image that differ from corresponding regions of the hyperspectral pre-ride image. In yet another example, the autonomous vehicle can include: a volumetric sensor, such as an ultrasonic sensor, configured to detect large objects left in the autonomous vehicle; an infrared rangefinder configured to detect objects in regions of the autonomous vehicle that should be free of objects (e.g., the trunk of the autonomous vehicle); and/or a LIDAR or other type of depth sensor configured to output a 3D image of the interior of the autonomous vehicle; etc.

However, the autonomous vehicle can: record pre- and post-ride sensor data of any other type or format (e.g., singular data values, 2D images, or 3D scans, etc.) in Blocks Silo and S120; detect differences between these pre- and post-ride sensor data in Block S130; and associate these differences in the pre- and post-ride sensor data with any other type of object in Block S140.

10. Remote Operator Assistance

In one variation shown in FIGS. 4 and 5, if the autonomous vehicle (or the remote computer system) flags a region of the post-ride image as "unknown" the autonomous vehicle can automatically transmit the flagged region of the post-ride image (or the entirety of the post-ride image with the flagged region highlighted) and a request for manual identification to a remote operator portal. At the remote operator portal, a human operator can then manually tag the flagged region of the post-ride image with one object type—in a set of preexisting object types—and return this tag to the autonomous vehicle (or to the remote computer system).

For example, in the implementation described above in which the autonomous vehicle implements deep learning techniques and an object model to calculate confidence scores for multiple object types of an object depicted in the isolated region of the post-ride image but none of these confidence scores exceeds a threshold score and/or if no frontrunner is evident in these confidence scores, the autonomous vehicle can flag the object as unknown. Accordingly, the autonomous vehicle can transmit the region of the post-ride image (or the post-ride image in its entirety) to a remote operator portal via a computer network for classification. A remote human operator at the remote operator portal may than manually identify the object and return an object type to the autonomous vehicle—via the computer network—to the autonomous vehicle. In response to identification of the object as a personal item or trash by the remote human operator, the autonomous vehicle can serve a prompt to the user to retrieve the object from the autonomous vehicle in Blocks S150, S152, and S154. Furthermore, the remote computer system (or the autonomous vehicle itself) can: access the region of the post-ride image depicting the object (or the post-ride image in its entirety); label the region of the post-ride image with the object type returned by the remote human operator; and retrain the object model according to the region of the post-ride image thus labeled by the remote human operator.

The autonomous vehicle can additionally or alternatively predict a type of an object represented in a flagged region of the post-ride image, as described above, and then send this flagged region of the post-ride image, a tag corresponding to this object type, and a request to confirm this object type to the remote operator portal. For example, if the autonomous vehicle identifies biological waste (e.g., vomit) or other liquid waste in a flagged region of the post-ride image, the autonomous vehicle can selectively transmit this region of the post-ride image (or the entirety of the post-ride image with the flagged region highlighted) and a request to confirm the type of this object to the remote operator. The autonomous vehicle can then selectively execute subsequent Blocks of the method based on whether the remote human operator confirms the object tag or selects an alternative object tag.

Alternatively, rather than autonomously identify types of objects left in the autonomous vehicle, the autonomous vehicle can automatically send all flagged regions of the post-ride image (or the entirety of the post-ride image with all flagged regions highlighted) to the remote operator portal for manual identification and tagging by a remote human operator in Block S140.

However, the autonomous vehicle (or the remote computer system) can query a remote human operator for assistance in any other way or in response to any other trigger.

11. Object Detection Response: Electronic Device

Block S150 of the method S100 recites, in response to characterizing the region of the post-ride image as an electronic device, rendering a prompt on an exterior display of the autonomous vehicle to return to the autonomous vehicle to collect the electronic device from the autonomous vehicle. (Block S150 can additionally or alternatively recite, in response to characterizing the region of the post-ride image as an electronic device, issuing an audible alarm at the autonomous vehicle to prompt the user to return to the autonomous vehicle to collect the electronic device from the autonomous vehicle.) Generally, in Block S150, the autonomous vehicle can prompt the user to return to the autonomous vehicle via select communication modes upon detecting an electronic device remaining in the autonomous vehicle following the user's departure, as shown in FIGS. 1 and 5.

In particular, the user may not be able to receive a phone call, text message, an in-application notification, or other electronic notification prompting her to return to the autonomous vehicle to retrieve her smartphone if the user left her smartphone in the autonomous vehicle. Therefore, if the autonomous vehicle detects a smartphone (or other electronic device) in the post-ride image in Block S140, the autonomous vehicle can: output an audible alarm, such as a prerecorded audio track including an instruction to retrieve a smartphone from the autonomous vehicle; and/or render a visible notification on an exterior-facing display on the autonomous vehicle to prompt the user to retrieve a smartphone from the autonomous vehicle.

For example, in response to classifying the object depicted in the region of the post-ride image as an electronic device, the autonomous vehicle can render a visual notification—including the prompt to return to the autonomous vehicle to retrieve a personal item (or an electronic device specifically)—on an exterior display facing a sidewalk adjacent the autonomous vehicle and/or on an exterior display of the autonomous vehicle adjacent a door that the user is exiting.

The autonomous vehicle can thus rapidly execute Blocks S120, S130, and S140 and begin issuing audible and/or visual alarms within seconds of the user exiting the autonomous vehicle—such as before the user closes her door or immediately after the user closes her door following arrival at the destination location—thereby prompting the user to return to the autonomous vehicle for her smartphone before walking too far from the autonomous vehicle to observe such audible and/or visual notifications.

In Block S150, the autonomous vehicle (or the remote computer system) can additionally or alternatively send—to an electronic account associated with the user—an email, text message, or other electronic communication to retrieve the user's smartphone, since this electronic communication may be received by a wearable device (e.g., a smartwatch) or other mobile computing device carried by the user. For example, the autonomous vehicle can generate an email or text message that: states that an electronic device was detected in the autonomous vehicle after the user exited the autonomous vehicle; includes a prompt to return to the autonomous vehicle for the electronic device within a limited period of time (e.g., 30 seconds, one minute) from time of transmission; and/or that includes a phone number, address, hours, etc. of a lost-and-found location at which the user may retrieve her electronic device if she fails to immediately return to the autonomous vehicle.

Furthermore, in this example, the autonomous vehicle can also insert the region of the post-ride image depicting the electronic device (or all or a greater segment of the post-ride image) into the notification in order to provide additional verification of the abandoned electronic device to the user. The autonomous vehicle can also populate the notification with a prompt to confirm the user's intent to return to the autonomous vehicle for the electronic device or to retrieve the electronic device from a lost-and-found location at a later time. Accordingly, the autonomous vehicle can wait for the user (for up to a threshold wait time) or immediately transition to a next scheduled ride in the autonomous vehicle's queue if the user confirms her intent to return to the autonomous vehicle for the electronic device or to retrieve the electronic from the lost-and-found location at a later time, respectively.

Upon detecting the electronic device in the autonomous vehicle in Block S140, the autonomous vehicle can additionally or alternatively: lower a window of the autonomous vehicle; and then send the electronic notification (e.g., a text message, an in-application notification) or initiate a telephone call to a phone number associated with the user in Block S150. Because the autonomous vehicle executes Blocks S120, S130, S140, and S150 relatively quickly, the electronic device—if it belongs to the user—may receive the electronic notification or phone call while the user is still in close proximity to the autonomous vehicle; furthermore, by lowering the window, the autonomous vehicle may enable the user to better hear an audible cue output by the electronic device upon receipt of the electronic notification or the inbound phone call.

In one variation in which multiple users occupy the autonomous vehicle during the ride, the autonomous vehicle can identify many or all riders in this group, such as: based on identities of riders who joined the ride request initiated by the user; based on identities of riders who joined a carpool hosted by the autonomous vehicle; by implementing facial recognition techniques to identify these riders in images recorded by the interior camera; or by wirelessly pairing with mobile computing devices carried by these riders and identifying these riders based on associations with unique identifiers of their mobile computing device. In this variation, if the autonomous vehicle detects and identifies an electronic device left in the autonomous vehicle at the conclusion of the ride in Block S140, the autonomous vehicle can transmit an electronic communication—containing a prompt to return to the autonomous vehicle for the electronic device—to mobile computing devices of each of these riders, such as to stored telephone numbers associated with each of these riders. Therefore, while one of these riders may have left her electronic device in the autonomous vehicle, these other riders exiting the autonomous vehicle at the destination location may receive this electronic notification and assist the rider in retrieving her electronic device from the autonomous vehicle.

However, the autonomous vehicle can audibly and/or visually indicate to the user that she has left an electronic device behind in the autonomous vehicle in any other way in Block S150. Furthermore, all or segments of the foregoing process can be executed remotely by the remote computer system in Block S150.

12. Object Detection Response: Personal Item

Block S152 of the method recites, in response to classifying the object depicted in the region of the post-ride image as a bag, transmitting an electronic notification to a mobile computing device associated with the user in Block S152, the electronic notification including a prompt to retrieve the bag from the autonomous vehicle. Generally, in Block S152, the autonomous vehicle can implement methods and techniques similar to those described above to rapidly communicate to the user that she has left a personal item—such as other than an electronic device—in the autonomous vehicle, as shown in FIGS. 2, 4, and 5.

In one implementation, in response to detecting a personal item—such as a box, bag, hat, jacket, scarf, or other tote or article of clothing—in the autonomous vehicle in Block S140 following the user's exit, the autonomous vehicle can trigger an audible and/or visual alarm prompting the user to return to the autonomous vehicle to collect her belongings, as in Block S150 described above. However, because the user may still be in possession of her smartphone despite leaving this personal item in the autonomous vehicle, the autonomous vehicle can also transmit (or trigger the remote computer system to transmit) a text message or other electronic notification to the user's smartphone. For example, the autonomous vehicle (or the remote computer system) can generate a text message or in-application notification that includes: a prompt to return to the autonomous vehicle to retrieve a personal item; a detected type of the personal item (e.g., a bag, a box, a purse, an umbrella, a sweater, a jacket, etc.); a region of the post-ride image in which this personal item was detected; a description of the autonomous vehicle (e.g., make, model, license plate number); and/or a time or timer indicating when the autonomous vehicle is scheduled to leave its current location (i.e., the user's designated destination location). By then rapidly sending this electronic notification to the user's smartphone once the personal item is detected in the autonomous vehicle, the autonomous vehicle can quickly prompt the user to return to the autonomous vehicle to collect her belongings.

In the foregoing implementation, the autonomous vehicle can also implement methods and techniques described above to prompt the user to indicate her intent to return to the autonomous vehicle for the abandoned personal item. For example, in response to classifying the object depicted in the region of the post-ride image as a personal item in Block S140, the autonomous vehicle can set a timer for retrieval of the object from the autonomous vehicle, such as for a maximum wait duration of one minute. Concurrently, the autonomous vehicle can: initialize an electronic communication directed to the user (e.g., to the user's stored phone number, to the user's account in an autonomous rideshare platform); populate the electronic communication with a first retrieval option to retrieve the object from the autonomous vehicle prior to expiration of the timer; populate the electronic communication with a second retrieval option to collect the object from the property collection location at a later time; (insert the region of the post depicting the personal item into the electronic communication); and transmit the electronic communication to the user's mobile computing device in Block S152. Subsequently, following receipt of the first retrieval option from the user's mobile computing device, the autonomous vehicle can delay autonomous navigation away from its current location until the earlier of retrieval of the object from the autonomous vehicle and expiration of the timer. However, following receipt of the second retrieval option from the mobile computing device, the autonomous vehicle can autonomously navigate from its current location to a nearest property collection location where a human operator may remove the personal item from the autonomous vehicle and store this personal item for later pickup by the user. However, regardless of the user's response to the electronic communication, the autonomous vehicle can depart from the user-specified destination location responsive to expiration of the timer.

The autonomous vehicle (or the remote computer system) can additionally or alternatively initiate a telephone call to the user's mobile computing device in Block S152. Once the user answers this telephone call, the autonomous vehicle (or the remote computer system) can replay a recorded message requesting the user return to the autonomous vehicle to collect a personal item left behind. Alternatively, the autonomous vehicle (or the remote computer system) can connect the user—via the telephone call—to a remote human operator who may then prompt the user to return to the autonomous vehicle and guide the user in retrieving her abandoned belongings from the autonomous vehicle.

However, the autonomous vehicle can indicate to the user that she has left a personal belonging—such as other than an electronic device—behind in the autonomous vehicle in any other way in Block 152. Furthermore, all or segments of the foregoing process can be executed remotely by the remote computer system in Block S152.

13. Object Detection Response: Trash

Block S154 of the method recites, in response to classifying the object depicted in the region of the post-ride image as waste, dispatching the autonomous vehicle to a cleanup location. Generally, in Block S154, the autonomous vehicle can implement methods and techniques similar to those described above to rapidly communicate to the user that trash (e.g., a bottle, a food wrapper, etc.) was detected in the autonomous vehicle, such as by: triggering an audible alarm; triggering a visual alarm; initiating an automated telephone call; and/or transmitting a text message or other electronic notification to the user after the user leaves the autonomous vehicle and after detecting the trash in the autonomous vehicle in Block S140.

In particular, if the autonomous vehicle detects new trash (i.e., non-biological waste) in the autonomous vehicle and this new trash was not detected in the autonomous vehicle prior to the user's entry into the autonomous vehicle, the autonomous vehicle can prompt the user to return to the autonomous vehicle to collect this trash from the autonomous vehicle in Block S154. However, if the user fails to return to the autonomous vehicle to retrieve this trash, the autonomous vehicle can automatically navigate to a cleaning or maintenance facility nearby for removal of this trash from the autonomous vehicle before initiating a next ride in the autonomous vehicle's queue.

For example, in response to classifying the object depicted in the region of the post-ride image as trash (e.g., based on features extracted from the region of the post-ride image and the object model described above) in Block S140, the autonomous vehicle can generate an electronic communication (e.g., a text message, an in-application notification) that includes: a prompt to return to the autonomous vehicle to collect abandoned trash; all or a portion of the post-ride image depicting the abandoned trash; a projected fare surcharge for failure to the remove the abandoned trash from the autonomous vehicle; a description of the autonomous vehicle (e.g., make, model, license plate number); and/or time that the autonomous vehicle is scheduled to depart from its current location (i.e., a remaining time available to the user to remove the trash from the autonomous vehicle before its departure), as shown in FIG. 4. The autonomous vehicle can then transmit this electronic communication to a mobile computing device registered to the user.

The autonomous vehicle can also implement methods and techniques described above to prompt the user to indicate her intent to return to the autonomous vehicle for the abandoned trash. For example, in response to classifying the object depicted in the region of the post-ride image as trash in Block S140, the autonomous vehicle can: set a timer for retrieval of the object from the autonomous vehicle (e.g., for a maximum wait duration of one minute); generate an electronic communication, as described above; populate the electronic communication with a first option to retrieve the trash from the autonomous vehicle prior to expiration of the timer; populate the electronic communication with a second option to release the autonomous vehicle for cleaning elsewhere (e.g., at a cleaning or maintenance facility, by a next rider); and transmit the electronic communication to the user's mobile computing device in Block S154. Subsequently, following receipt of the first option from the user's mobile computing device, the autonomous vehicle can delay autonomous navigation away from its current location until the earlier of retrieval of the trash from the autonomous vehicle and expiration of the timer. However, following receipt of the second option from the mobile computing device, the autonomous vehicle can autonomously navigate from its current location to a nearest cleaning or maintenance facility for cleaning. However, regardless of the user's response to the electronic communication, the autonomous vehicle can depart from the user-specified destination location responsive to expiration of the timer.

In one variation, if the user fails to return to the autonomous vehicle to retrieve the trash or elects to release the autonomous vehicle, the autonomous vehicle (or the remote computer system) can serve a prompt or request—to a second user associated with a next ride assigned to the autonomous vehicle—to remove this trash from the autonomous vehicle. For example, the remote computer system can assign a next ride requested by a second user to the autonomous vehicle, such as during completion of the current ride by the autonomous vehicle. However, if the autonomous vehicle detects trash in the passenger compartment and the user fails to or elects not to retrieve this trash from the autonomous vehicle, the autonomous vehicle can: initialize an electronic communication to the second user; insert the region of the post-ride image depicting the trash; populate the electronic communication with an offer to discount the second rider's fare if the second rider removes this trash from the autonomous vehicle; insert—into the electronic communication—options to confirm removal of the trash from the autonomous vehicle or deferral of the ride to another autonomous vehicle; and serve this autonomous vehicle to a second mobile computing device associated with the second user. If the second user responds to the electronic communication with confirmation to remove the trash from the autonomous vehicle in exchange for reduced fare, the autonomous vehicle can immediately initiate the second ride for the second user and autonomously navigate to a second pickup location specified by the second user. Upon arriving at the second user's specified destination location, the autonomous vehicle can: repeat the foregoing methods and techniques to verify that the trash has been removed from the autonomous vehicle and the second user has not abandoned another object in the autonomous vehicle; and then discount the second user's fare after confirming that the trash was removed at the conclusion of the second ride. However, if the second user defers to remove the trash from the autonomous vehicle, the autonomous vehicle can trigger a fleet manager (e.g., an autonomous rideshare platform) to reassign the second rider to another autonomous vehicle nearby and instead autonomously navigate to a maintenance facility for cleaning. The autonomous vehicle can similarly autonomously navigate to a maintenance facility for cleaning if the second user elected to remove the trash from the autonomous vehicle responsive to the electronic communication but the autonomous vehicle detected this same or other trash in the autonomous vehicle following conclusion of the second ride.

However, the autonomous vehicle can prompt the user to return to the autonomous vehicle to collect her trash in any other way in Block 154. Furthermore, all or segments of the foregoing process can be executed remotely by the remote computer system in Block S154.

14. Object Detection Response: Liquid

In one variation in which the autonomous vehicle detects waste (e.g., spilled liquid; spilled food; biological waste, such as vomit; or suspicious waste, such as a hypodermic needle) in the region of the post-ride image in Block S154, the autonomous vehicle can immediately navigate to a cleaning or maintenance station for cleanup, as shown in FIG. 5. In particular, following detection of biological waste, wet waste, or suspicious waste—which may require more extensive cleaning operations—in the passenger compartment of the autonomous vehicle, the autonomous vehicle can autonomously navigate to a nearby cleaning station without providing the user an option to clean this waste out of the autonomous vehicle.

For example, in response to classifying an object depicted in a region of a post-ride image as a liquid, biological waste, or other suspicious waste based on features extracted from the region of the post-ride image and the object model described above, the autonomous vehicle can: defer a next queued ride to another autonomous vehicle; autonomously navigate to a maintenance facility for cleanup; and append the user's fare with a cleaning fee.

The autonomous vehicle (or the remote computer system) can also generate a text message, email, or other electronic notification that includes: an indication that biological waste was detected in the autonomous vehicle; all or portions of the pre- and post-ride images, such as with the biological waste highlighted in the latter; the fare surcharge for cleaning the autonomous vehicle's interior; a description of the autonomous vehicle (e.g., make, model, license plate number); and/or the route traversed by the autonomous vehicle during this ride; etc. The native application (or the remote computer system) can then transmit this electronic notification to a mobile computing device registered to the user as documentation of the ride and handling of the detected waste.

However, the autonomous vehicle can respond to detected liquid, biological waste, or other suspicious waste in any other way in Block 154. Furthermore, all or segments of the foregoing process can be executed remotely by the remote computer system in Block S154.

15. Damage

In a similar variation, the autonomous vehicle can alternatively classify a region of the post-ride image—which differs from the pre-ride image—as vehicle damage in Block S140. Thus, in response to detecting damage to the interior of the autonomous vehicle in the second region of the second post-ride image, the autonomous vehicle can: defer a next queued ride to another autonomous vehicle; autonomously navigate to a maintenance facility for repair; and append the user's fare with a repair fee.

16. Retrieval Security

In one variation, to prevent theft of an electronic device, other personal item, or trash from the autonomous vehicle while waiting for the user to return to autonomous vehicle, the autonomous vehicle can lock its doors by default once the user exits the autonomous vehicle and selectively unlock these doors only once the user is re-verified at the autonomous vehicle. In particular, once the user exits the autonomous vehicle, the autonomous vehicle can execute a "handshake" routine to confirm the identify of the user upon the user's return to the autonomous vehicle to collect an electronic device, other personal item, or trash.

For example, the autonomous vehicle (or the remote computer system) can send an access code to the user's mobile computing device, such as when the user requests a ride from the autonomous vehicle or when transmitting an electronic notification to the user's computing device in Block S152. The user may then enter this code at an exterior keypad on the autonomous vehicle to regain entry into the autonomous vehicle. In another example, when the user approaches the autonomous vehicle, the autonomous vehicle can scan the user via an exterior-facing optical sensor in the autonomous vehicle and implement face detection techniques to confirm the user's identify before unlocking its doors. In yet another example, the autonomous vehicle can unlock its doors when the user's mobile computing device comes within wireless range of the autonomous vehicle.

In another implementation, the autonomous vehicle detects exit of the user from the autonomous vehicle and automatically locks the doors of the autonomous vehicle in response to detecting exit of the user from the autonomous vehicle and closure of each door of the autonomous vehicle. However, in response to detecting and identifying an abandoned object in the post-ride image (e.g., as an electronic device, personal item, or waste) in Blocks S130 and S140, the autonomous vehicle can serve an electronic prompt to the user's mobile computing device, output an audible alarm, and/or render a prompt to return for the object on an exterior-facing display on the autonomous vehicle in Block S150, S152, etc. While waiting for the user to return to the autonomous vehicle for the abandoned object and with the doors of the autonomous vehicle still locked, the autonomous vehicle can scan a field around its exterior for the user, such as via exterior-facing color cameras arranged on the autonomous vehicle. For example, the autonomous vehicle can include exterior-facing cameras configured to primarily record color images for autonomous navigation and/or exterior-facing cameras configured to capture color images of users approaching and entering the autonomous vehicle. Once the user exits the autonomous vehicle, the autonomous vehicle can: record images of the field around the autonomous vehicle via one or more of these exterior-facing cameras; implement facial recognition techniques to identify the user returning to the autonomous vehicle; and automatically unlock all doors of the autonomous vehicle or a particular door nearest the approaching user responsive to detecting the user. In this example, earlier during execution of the ride, the autonomous vehicle can record an interior video feed of the user occupying the autonomous vehicle via an interior camera arranged inside the autonomous vehicle; and generate a facial recognition model of the user based on features extracted from this interior video feed. Alternatively, the autonomous vehicle can access an existing facial recognition model of the user, such as generated in cooperation with the user when first creating a user profile on the autonomous rideshare platform via a native rideshare application executing on the user's mobile computing device. Once the user exits the autonomous vehicle at the conclusion of the current ride, the autonomous vehicle can therefore: record an exterior video feed via an exterior camera defining a field of view facing outwardly from the autonomous vehicle; detect the user in the field around the exterior of the autonomous vehicle based on alignment between features detected in the exterior video feed and the facial recognition mode; and then unlock a door nearest the user accordingly, thereby enabling the user to access the passenger compartment and retrieve the abandoned object from the autonomous vehicle.

However, in this implementation, the autonomous vehicle can identify the user returning to the autonomous vehicle based on other user features, such as: based on the user's predominant clothing colors or patterns detected while the user occupied the autonomous vehicle; or by detecting an optical fiducial—contained in an electronic communication recently served to the user's mobile computing device—rendered on a mobile computing device presented to an exterior-facing camera on the autonomous vehicle by the user returning to the autonomous vehicle; etc.

However, in this variation, the autonomous vehicle can implement any other method or technique to gate access to the autonomous vehicle's interior until the user's identity is re-verified upon return to the autonomous vehicle.

17. Autonomous Vehicle Release

Following the user's exit from the autonomous vehicle, the autonomous vehicle can pause at the destination location, autonomously navigate to a lost-and-found station or cleaning station nearby, or immediately resume operation according to a next assigned rideshare job based on whether a foreign object is detected in the autonomous vehicle in Block S130 and a type of this object determined in Block S140, as shown in FIG. 5.

In one implementation, if the autonomous vehicle detects no foreign object left in its interior following the user's exit from the autonomous vehicle at her designated destination location, the remote computer system can immediately release the autonomous vehicle from serving this user and assign a next rideshare job to this autonomous vehicle, as shown in FIG. 5. However, if the autonomous vehicle detects a foreign object—other than biological or wet waste—in the interior of the autonomous vehicle, the autonomous vehicle can wait at (or near) the destination location for a minimum of the preset hold duration and until a next rideshare job is assigned to the autonomous vehicle, thereby permitting the user at least the preset hold duration to return to the autonomous vehicle to retrieve this object.

In particular, the autonomous vehicle can implement a preset hold duration over which the user is permitted to return to the autonomous vehicle to collect an object, as shown in FIGS. 3 and 5. Once the user exits the autonomous vehicle and the autonomous vehicle detects a foreign object (other than biological waste) in the autonomous vehicle's interior, the autonomous vehicle can initiate a timer for this preset hold duration and hold at its current location until the timer expires. If the user does not return to the autonomous vehicle before the timer expires, the autonomous vehicle can then resume operation and autonomously navigate to a lost-and-found or cleaning destination location, such as en route to a pickup location designated in a next assigned rideshare job or instead of accepting this next rideshare job.

Furthermore, if the user does return to the autonomous vehicle and opens a door of the autonomous vehicle before the timer expires, the autonomous vehicle can: record a third image of the interior of the autonomous vehicle once the user closes the door; and then repeat the foregoing methods and techniques to compare this third image to the pre- and/or post-ride images to determine whether a foreign object detected previously still occupies the autonomous vehicle's interior. If the autonomous vehicle determines from the third image that all foreign objects have been removed from the autonomous vehicle, the autonomous vehicle can accept a next rideshare job and resume operation accordingly. However, if the autonomous vehicle determines that the foreign object still occupies the autonomous vehicle, the autonomous vehicle can: navigate to a lost-and-found or cleaning station; and determine that the user intentionally left the foreign object in the autonomous vehicle, flag the user (e.g., as a litterer), and/or fine the user for littering inside the autonomous vehicle accordingly.

Similarly, if the autonomous vehicle detects biological or other wet waste in the autonomous vehicle's interior in Block S140, the remote computer system can immediately dispatch the autonomous vehicle to a local cleanup location without prompting the user to remove this waste from the autonomous vehicle. The remote computer system can also automatically add a surcharge to the user's invoice or automatically initiate a second transaction with the user's supplied payment method to cover costs related to cleaning the autonomous vehicle's interior and/or the autonomous vehicle's downtime during this cleanup.

The autonomous vehicle (or the remote computer system) can also quantify or qualify a cleanliness (or "sanitary level") of the autonomous vehicle's interior as a result of the user's occupation of the autonomous vehicle during the ride and then selectively resume rideshare operation or return to a cleaning station based on the severity of the sanitary level of the autonomous vehicle's interior. For example, the autonomous vehicle may: withhold prompting the user to return to the autonomous vehicle to retrieve a used water bottle cap; serve a prompt to the user to retrieve an empty water bottle and wait for a preset duration (e.g., 45 seconds) for the user to do so; and immediately autonomously navigate to a cleaning station for cleanup once the user exits the autonomous vehicle if biological waste (e.g., vomit) is detected in the autonomous vehicle's interior (and once this waste is confirmed by a remote operator).

18. Machine Learning

In one variation shown in FIG. 4, the autonomous vehicle can develop and/or retrain the object model (e.g., the corpus of template images) implemented in Block S140 based on pre- and post-ride images recorded by the autonomous vehicle over time. For example, the autonomous vehicle (or the remote computer system) can selectively query a remote human operator to identify an unknown object represented in a flagged region of a post-ride image or to confirm an object type detected in a flagged region of a post-ride image, as described above. The remote computer system can then label this flagged region of the post-ride image according to the remote human operator's feedback and retrain the object model according to this new labeled image data. In another example, upon arrival of the autonomous vehicle at a cleanup or lost-and-found station, the autonomous vehicle or the remote computer system can: prompt a human operator at this station to confirm a type of object left in vehicle; label a flagged region in a preceding post-ride image according to feedback provided by this human operator; and then retrain the object model according to this new labeled image data.

The autonomous vehicle and/or the remote computer system can implement similar methods and techniques to prompt the user to identify an object detected in the autonomous vehicle, such as a native application or web browser executing on the user's smartphone.

However, the autonomous vehicle and the remote computer system can cooperate in any other way to develop and/or retrain the object model based on image data and labels collected over time during execution of Blocks of the method.

19. Rider Assistance

In one variation, the autonomous vehicle monitors the use during execution of the ride and automatically detours to a hospital, medical clinic, or other destination responsive to a detected state of the user.

In one implementation, during execution of the ride, the autonomous vehicle: records an interior video feed via an interior camera defining a field of view spanning a section of the interior of the autonomous vehicle occupied by the user; and tracks movements, posture, breathing rate, heart rate, and/or other biosignals of the user during the ride from this video feed. In response to detected movements, posture, breathing rate, and/or heart rate, etc. deviating from a human rider model, the autonomous vehicle can issue a rider check flag and transmit a request for rider verification to a remote operator portal. For example, the autonomous vehicle can transmit a request for rider verification and a frame in the video feed or stream the video feed to a remote operator portal; a remote human operator at the remote operator portal may then review the frame or video feed to estimate the user's current health state. If the remote human operator estimates that the user is asleep or otherwise healthy, the remote human operator can clear the rider check flag. Alternatively, if the remote human operator estimates that the user is currently unhealthy, the remote human operator can issue a command to the autonomous vehicle to autonomously navigate to a nearby hospital or other medical clinic.

However, if the remote human operator is unable to confidently estimate the rider's current health state based on the frame or video feed, the remote human operator can connect an audio channel at the remote operator portal to the autonomous vehicle (e.g., via a cellular network); and the autonomous vehicle can output—through an audio speaker in the interior of the autonomous vehicle—an audio signal received from the remote human operator, thereby enabling the remote human operator to orally communicate with the user inside the autonomous vehicle and to verify the health status of the user. The remote human operator can then clear the rider check flag or dispatch the autonomous vehicle to a hospital or other medical clinic nearby based on this interaction with the user.

However, the autonomous vehicle can implement any other method or technique to detect and track a health status of the user and to selectively continue navigation to the user's specified destination location or detour to a hospital or medical clinic nearby based on the user's health status—such as detected by the autonomous vehicle and/or verified by a remote human operator.

In a similar implementation, after arriving at the destination location, the autonomous vehicle records a post-ride image, such as after waiting at the destination location for the user to exit the autonomous vehicle for a threshold wait time (e.g., one minute). In this implementation, if no door of the autonomous vehicle has opened within this threshold wait time and/or if a seat sensor in the autonomous vehicle still detects that a seat is occupied upon conclusion of this threshold wait time, the autonomous vehicle can: interpret this scenario as a possible user complication; and serve the post-ride image and a request for assistance to a remote operator portal. Upon reviewing the post-ride image, the remote operator may immediately trigger the autonomous vehicle to navigate to a hospital or medical clinic nearby.

Alternatively, the remote operator may elect to open a communication link between the remote operator portal and the autonomous vehicle; the autonomous vehicle can then output an audio signal (and video feed) from the remote operator portal into the passenger compartment and return a video feed (and audio signal) of the passenger compartment back to the remote operator portal, such as over a cellular network. The autonomous vehicle can this cooperate with the remote operator portal to enable the remote operator to: communicate with the user; identify a possible user complication (e.g., if the user is unresponsive); and/or to wake the user if the user asleep. If prompted by the remote operator, the autonomous vehicle can resume autonomous navigation to a nearest hospital or medical.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a human annotator computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for monitoring an interior state of an autonomous vehicle, the method comprising:
   recording a pre-ride image of an interior of the autonomous vehicle prior to unlocking doors of the autonomous vehicle for a user at a pickup location in connection with initiating a ride corresponding to a ride request;
   autonomously navigating to a destination location specified in the ride request following completion of the ride, recording a post-ride image of the interior of the autonomous vehicle in response to detecting a departure of the user from the autonomous vehicle following arrival at the destination location;
   detecting a region of the post-ride image differing from the pre-ride image, the region of the post-ride image representing a change in the interior of the autonomous vehicle following occupancy of the autonomous vehicle by the user;
   classifying a type of an object depicted in the region of the post-ride image based on features extracted from the region of the post-ride image; and
   in response to classifying the object depicted in the region of the post-ride image as a personal item, serving a prompt to the user to retrieve the object from the autonomous vehicle.

2. The method of claim 1, wherein serving the prompt includes at least one of sending a communication to a mobile device associated with the user or a visual notification displayed using a display arranged on the autonomous vehicle.

3. The method of claim 1, wherein serving the prompt includes issuing an audible alarm at the autonomous vehicle.

4. The method of claim 1, wherein the prompt is served automatically to the user to retrieve the object from the autonomous vehicle in response to a confidence score for classification of the object as the personal item exceeding a threshold score.

5. The method of claim 4, wherein the prompt is served following manual review when the confidence score for classification of the object is below the threshold score.

6. The method of claim 1, wherein a video of a section of the interior of the autonomous vehicle is captured via a camera arranged in the autonomous vehicle.

7. The method of claim 1, wherein the departure of the user is detected based on a closure of a last door of the autonomous vehicle following arrival of the autonomous vehicle at the destination location.

8. The method of claim 1, wherein in response to classifying the object as a liquid, the autonomous vehicle navigates autonomously to a facility for cleanup.

9. The method of claim 1, wherein in response to classifying the object as trash, prompting removal of the object from the autonomous vehicle.

10. The method of claim 9, wherein in response to classifying the object as trash or a liquid, the autonomous vehicle navigates autonomously to a facility for cleanup and a cleaning surcharge is appended to a fare for the ride.

11. The method of claim 1, wherein in response to detecting damage to the interior of the autonomous vehicle in the post-ride image, the autonomous vehicle navigates autonomously to a facility for repair.

12. The method of claim 1, wherein the prompt includes the region of the post-ride image.

13. The method of claim 12, wherein autonomous navigation away from the destination location is delayed until an earlier of retrieval of the object from the autonomous vehicle and an expiration of a timer.

14. The method of claim 1, wherein a field around an exterior of the autonomous vehicle is scanned for the user following the prompt being served to the user.

15. The method of claim 14, wherein the user is detected in the field around the exterior of the autonomous vehicle using facial recognition.

16. The method of claim 1, wherein the autonomous vehicle autonomously changes the destination location to a hospital when detected movements and posture of the user deviate from a human rider model, the autonomous vehicle autonomously navigating to the hospital.

17. One or more tangible non-transitory computer-readable storage media storing computer-executable instructions for performing a computer process on a computing system, the computer process comprising:
   obtaining a pre-ride image of an interior of an autonomous vehicle prior to unlocking doors of the autonomous vehicle for entry of a user into the autonomous vehicle at a pickup location corresponding to a ride request, the autonomous vehicle autonomously navigating to a destination location specified in the ride request;

in response to detecting a departure of the user from the autonomous vehicle following arrival at the destination, recording a post-ride image of the interior of the autonomous vehicle;

comparing the post-ride image to the pre-ride image to identify a region of the post-ride image representing a change in the interior of the autonomous vehicle following occupancy of the user in the autonomous vehicle;

implementing an object model to classify an object depicted in the region of the post-ride image; and in response to classifying the object depicted in the region of the post-ride image as a personal item, generating a prompt to the user to retrieve the object from the autonomous vehicle.

18. The one or more tangible non-transitory computer-readable storage media of claim 17, wherein serving the prompt includes at least one of sending a communication to a mobile device associated with the user or a visual notification displayed using a display arranged on the autonomous vehicle.

19. The one or more tangible non-transitory computer-readable storage media of claim 17, wherein the autonomous vehicle navigates to a facility for repair in response to damage to the interior of the autonomous vehicle being detected in the post-ride image.

20. The one or more tangible non-transitory computer-readable storage media of claim, 17, wherein the autonomous vehicle navigates to a facility for cleanup in response to classification of the object as a liquid.

* * * * *